(12) United States Patent
McKenney et al.

(10) Patent No.: US 7,734,879 B2
(45) Date of Patent: Jun. 8, 2010

(54) EFFICIENTLY BOOSTING PRIORITY OF READ-COPY UPDATE READERS IN A REAL-TIME DATA PROCESSING SYSTEM

(75) Inventors: Paul E. McKenney, Beaverton, OR (US); Suparna Bhattacharya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 11/460,465

(22) Filed: Jul. 27, 2006

(65) Prior Publication Data

US 2008/0040720 A1 Feb. 14, 2008

(51) Int. Cl.
G06F 12/00 (2006.01)
(52) U.S. Cl. .................. 711/151; 711/150; 711/167
(58) Field of Classification Search .............. 711/147, 711/150–152
See application file for complete search history.

(56) References Cited

U.S. PATENT DOCUMENTS

| | | | |
|---|---|---|---|
| 5,442,758 | A | 8/1995 | Slingwine et al. |
| 5,608,893 | A | 3/1997 | Slingwine et al. |
| 5,727,209 | A | 3/1998 | Slingwine et al. |
| 6,219,690 | B1 | 4/2001 | Slingwine et al. |
| 6,874,144 | B1 | 3/2005 | Kush |
| 6,886,162 | B1 | 4/2005 | McKenney |
| 2004/0216112 | A1 | 10/2004 | Accapadi et al. |
| 2005/0022186 | A1 | 1/2005 | Accapadi et al. |
| 2005/0050550 | A1 | 3/2005 | Fuller |
| 2005/0060710 | A1* | 3/2005 | Kush ............... 718/103 |
| 2005/0071577 | A1* | 3/2005 | Dias et al. ......... 711/151 |
| 2005/0080824 | A1 | 4/2005 | Vaidyanathan et al. |
| 2005/0125789 | A1* | 6/2005 | Dijkstra et al. .... 718/100 |
| 2009/0006403 | A1* | 1/2009 | McKenney ........ 707/8 |

OTHER PUBLICATIONS

J. Seigh, "RCU + SMR for preemptive kernel/user threads," Linux Kernel Mailing List, May 9, 2005, 2 pages.
M. Michael, "Hazard Pointers: Safe Memory Reclamation for Lock-Free Objects," IEEE Transactions On Parallel And Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.

(Continued)

*Primary Examiner*—Shane M Thomas
(74) *Attorney, Agent, or Firm*—Walter W. Duft; Steven L. Bennett (57) ABSTRACT

A technique for efficiently boosting the priority of a preemptable data reader in order to eliminate impediments to grace period processing that defers the destruction of one or more shared data elements that may be referenced by the reader until the reader is no longer capable of referencing the data elements. Upon the reader being subject to preemption or blocking, it is determined whether the reader is in a read-side critical section referencing any of the shared data elements. If it is, the reader's priority is boosted in order to expedite completion of the critical section. The reader's priority is subsequently decreased after the critical section has completed. In this way, delays in grace period processing due to reader preemption within the critical section, which can result in an out-of-memory condition, can be minimized efficiently with minimal processing overhead.

20 Claims, 8 Drawing Sheets

OTHER PUBLICATIONS

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

S. Rostedt, "Patch: Document futex PI design," May 9, 2006, 14 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

* cited by examiner

EFFICIENTLY BOOSTING PRIORITY OF READ-COPY UPDATE READERS IN A REAL-TIME DATA PROCESSING SYSTEM

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a preemptive real-time computing environment. Still more particularly, the invention is directed to a technique for reducing performance degradation due to the preemption of non-real-time processes holding references to shared data that could otherwise be freed.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

Figure 1A:
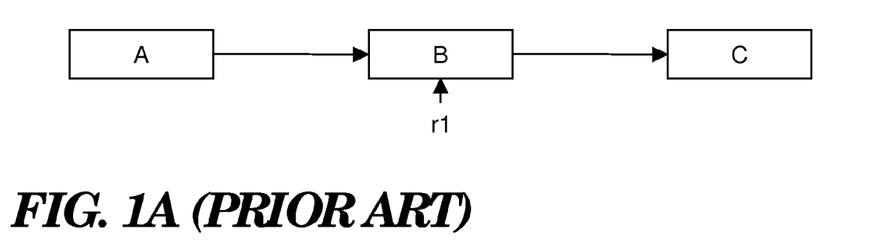
FIGS. 1A-1D are diagrammatic representations of a linked list of data elements undergoing a data element replacement according to a conventional read-copy update mechanism.
Figure 1B:
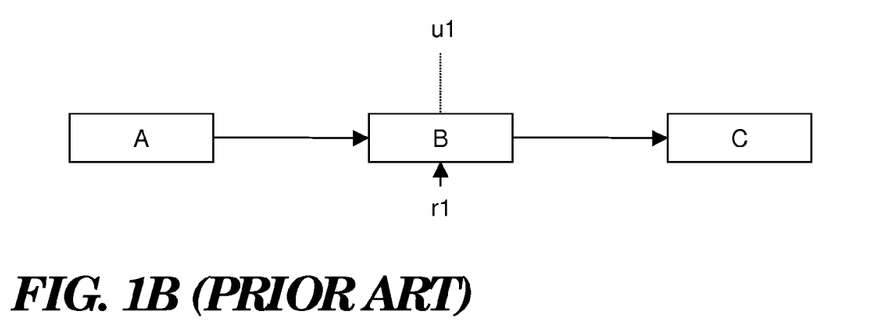
Figure 1C:
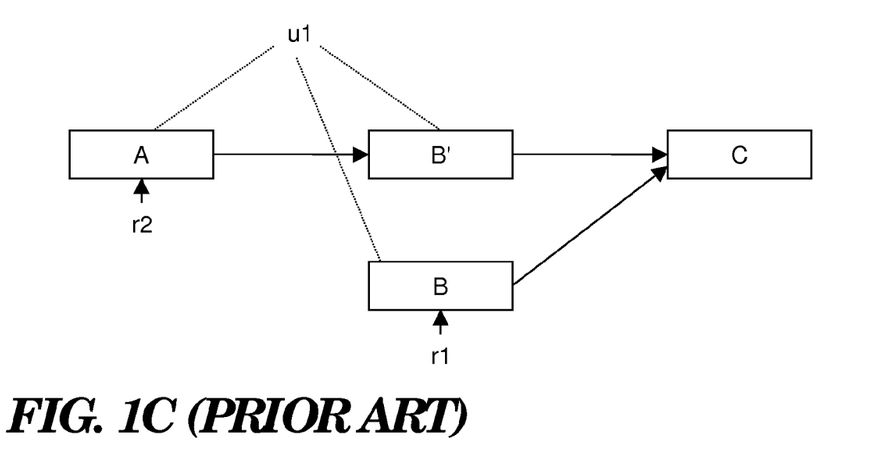

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. As an alternative to locking, other techniques such as non-blocking synchronization or a designated update thread could be used to serialize data updates. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

Figure 1D:
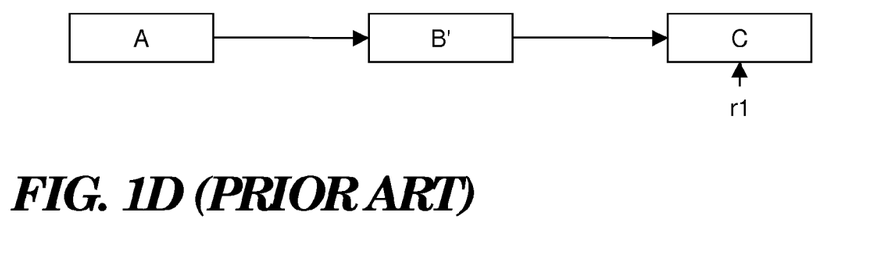

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

Figure 2A:
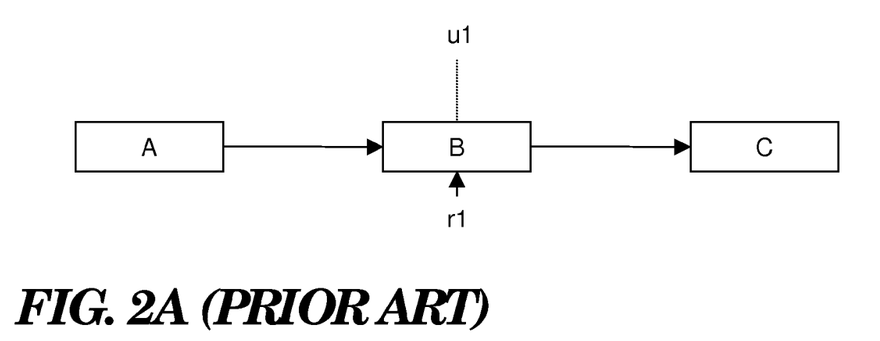
FIGS. 2A-2C are diagrammatic representations of a linked list of data elements undergoing a data element deletion according to a conventional read-copy update mechanism.
Figure 2B:
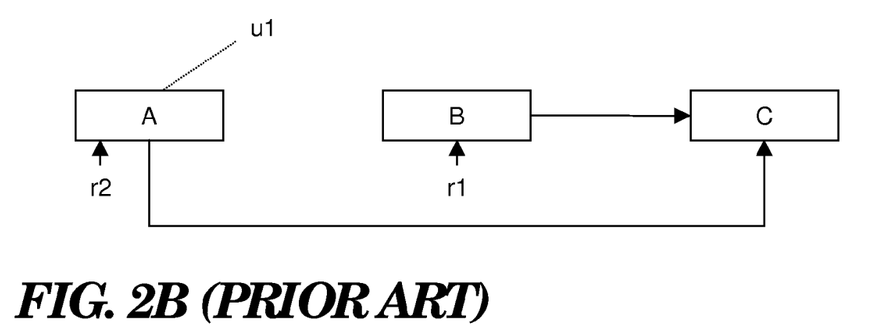
Figure 2C:
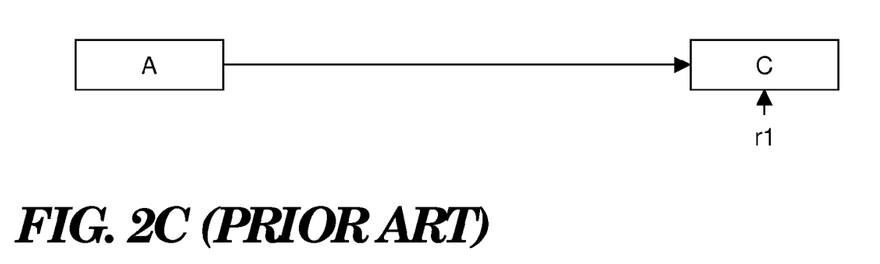

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

Figure 3:
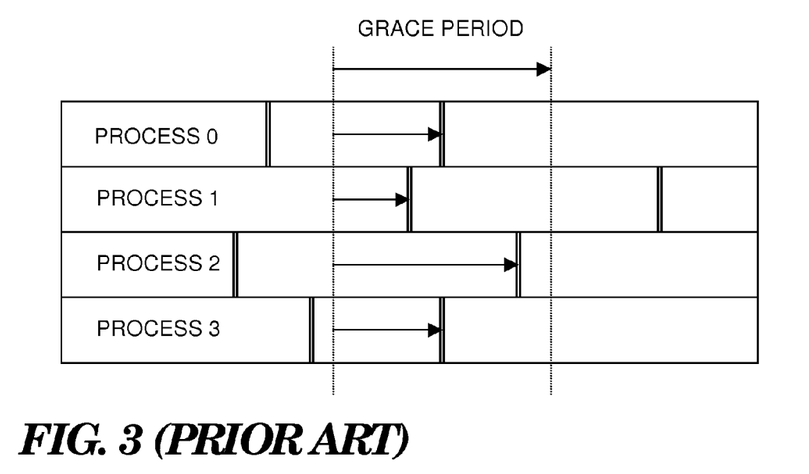
FIG. 3 is a flow diagram illustrating a grace period in which four processes pass through a quiescent state.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring."

The callback processing technique contemplates that an updater of a shared data element will perform the initial (first phase) data update operation that creates the new view of the data being updated, and then specify a callback function for performing the deferred (second phase) data update operation that removes the old view of the data being updated. The updater will register the callback function (hereinafter referred to as a "callback") with a read-copy update subsystem so that it can be executed at the end of the grace period. The read-copy update subsystem keeps track of pending callbacks for each processor and monitors per-processor quiescent state activity in order to detect when each processor's current grace period has expired. As each grace period expires, all scheduled callbacks that are ripe for processing are executed.

Conventional grace period processing faces challenges in a preemptive realtime computing environment because a low priority reader holding a reference to shared data can be preempted by a higher priority process or blocked from acquiring a lock while in the read-side critical section. If the reader remains preempted or blocked for an extended period of time, grace periods cannot proceed and callbacks will not be processed. This can result in out-of-memory situations, which in turn can prevent high priority real-time processes from proceeding. A technique is therefore needed so that the priority of a preempted or blocked reader can be boosted, which would cause the reader to be scheduled ahead of other processes and complete its read-side critical section. This would allow grace-period processing to continue, eventually freeing memory and thereby permitting high-priority real-time processes to proceed without resource starvation.

Unfortunately, there might be a large number of reader processes potentially residing in a read-side critical section and a question arises as to how to identify preempted readers in an efficient manner. Scanning a data processing system's full list of processes is not an attractive solution because such scanning can be time-consuming and could potentially prevent high priority realtime processes from meeting their scheduling deadlines. Scanning only reader processes would be a better approach. However, creating and maintaining a list of each reader process that is currently within a read-side critical section is problematic. For example, such a list would require the use of expensive atomic instructions, spinlocks, and/or memory barriers within the RCU fast-path code used in preemptive realtime systems when readers enter and exit their critical sections (e.g., the rcu_read_lock( ) and rcu_read_unlock( ) primitives of the Linux® Kernel). Moreover, only a small fraction of read processes residing in a read-side critical section will normally be responsible for holding up current grace period processing as a result of being preempted or blocked. The vast majority of such readers will not be disturbed. Thus, a scan of even a reader process list would also waste valuable CPU time and degrade realtime latencies.

Accordingly, there is an unsolved need for a priority-boosting technique that overcomes the foregoing problems. What is needed is a solution that efficiently boosts the priority of only those readers that are holding up current grace period processing without having to scan large numbers of extraneous processes and without needing expensive operations within the common-case code paths of existing RCU primitives.

SUMMARY OF THE INVENTION

The foregoing problems are solved and an advance in the art is obtained by a method, system and computer program product for efficiently boosting the priority of a preemptable data reader in order to eliminate impediments to grace period processing that defers the destruction of one or more shared data elements that may be referenced by the reader until the reader is no longer capable of referencing the data elements. Upon the reader being subject to preemption or blocking, it is determined whether the reader is in a read-side critical section referencing any of the shared data elements. If it is, the reader's priority is boosted in order to expedite completion of the critical section. The reader's priority is subsequently decreased after the critical section has completed. In this way, delays in grace period processing due to reader preemption within the critical section, which can result in an out-of-memory condition, can be minimized efficiently with minimal processing overhead.

According to exemplary embodiments disclosed herein, the priority boosting may be performed by one of a scheduler or a lock priority subsystem. The priority boost level may be a priority that is higher than a base priority of all non-realtime processes that would otherwise be capable of preempting the reader. The priority boosting may include boosting the reader's priority to a first priority boost level if the reader is in the critical section and to a second priority boost level upon the occurrence of a predetermined condition. The predetermined condition may be one of a grace period delay signifying an impending out-of-memory condition or the reader having entered the critical section prior to a current grace period. Following priority boosting, the reader may be placed on one of two lists depending on when the reader started its critical section. The reader may be placed on a first list of priority boosted readers if the reader entered the critical section during a current grace period. The reader may be placed on a second list of priority boosted readers if the reader entered the critical section during a previous grace period. The second list is used to identify readers whose priorities may need to be boosted higher than readers on the first list due to the fact that such readers will have been in a critical section for a longer time and are more likely to be holding up grace period processing. As a current grace period ends and a new grace period begins, readers on the first list may be moved to the second list insofar as they will then be readers whose critical sections began prior to the new grace period.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 4:
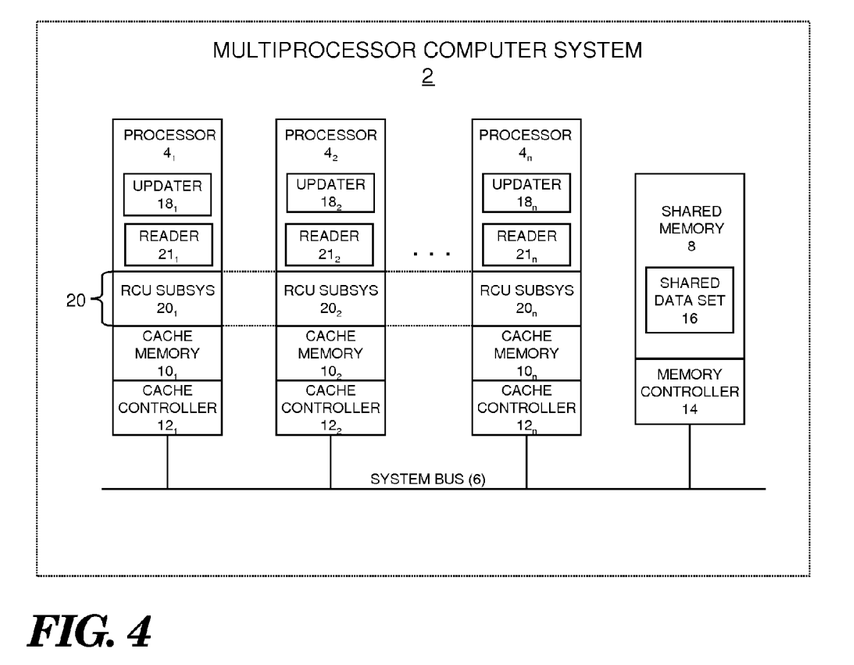
FIG. 4 is a functional block diagram showing a multiprocessor computing system that represents an exemplary environment in which the present invention can be implemented.

Turning now to the figures, wherein like reference numerals represent like elements in all of the several views, FIG. 4 illustrates an exemplary computing environment in which the present invention may be implemented. In particular, a symmetrical multiprocessor (SMP) computing system 2 is shown in which multiple processors $4_1, 4_2 \ldots 4_n$ are connected by way of a common system bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a single multitasking operating system adapted for use in an SMP environment. In the alternative, a single processor computing environment could be used to implement the invention.

It is further assumed that update operations executed within kernel or user mode processes, threads, or other execution contexts will periodically perform updates on a set of shared data 16 stored in the shared memory 8. Reference numerals $18_1, 18_2 \ldots 18_n$ illustrate individual data update operations (updaters) that may periodically execute on the several processors $4_1, 4_2 \ldots 4_n$. As described by way of background above, the updates performed by the data updaters $18_1, 18_2 \ldots 18_n$ can include modifying elements of a linked list, inserting new elements into the list, deleting elements from the list, and many other types of operations. To facilitate such updates, the several processors $4_1, 4_2 \ldots 4_n$ are programmed to implement a read-copy update (RCU) subsystem 20, as by periodically executing respective RCU instances $20_1, 20_2 \ldots 20_n$ as part of their operating system functions. Each of the processors $4_1, 4_2 \ldots 4_n$ also periodically executes read operations (readers) $21_1, 21_2 \ldots 21_n$ on the shared data 16. Such read operations will typically be performed far more often than updates, insofar as this is one of the premises underlying the use of read-copy update.

Figure 5:
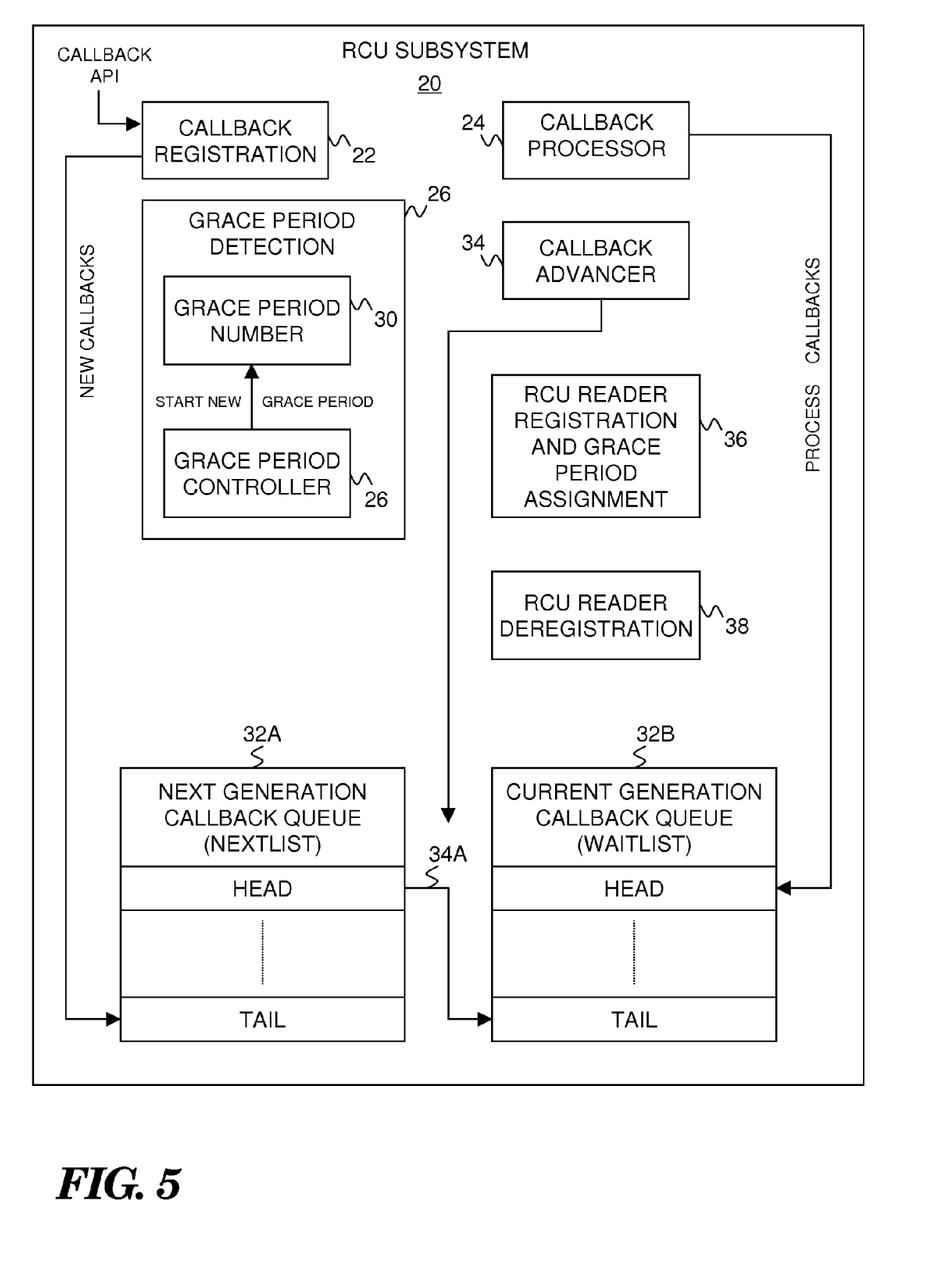
FIG. 5 is a functional block diagram showing a read-copy update subsystem that may be implemented by each processor in the multiprocessor computer system of FIG. 4.

As shown in FIG. 5, the RCU subsystem 20 includes a callback registration component 22. The callback registration component 22 serves as an API (Application Program Interface) to the RCU subsystem 20 that can be called by the updaters $18_2 \ldots 18_n$ to register requests for deferred (second phase) data element updates following initial (first phase) updates performed by the updaters themselves. As is known in the art, these deferred update requests involve the destruction of stale data elements, and will be handled as callbacks within the RCU subsystem 20. A callback processing component 24 within the RCU subsystem 20 is responsible for executing the callbacks, then removing the callbacks as they are processed. A grace period detection component 26 determines when a grace period has expired so that the callback processor 24 can execute a new generation of callbacks. The grace period detection component 26 includes a grace period controller 28 that keeps track of the current grace period number 30 and determines when an old grace period has expired and a new grace period should start.

The read-copy update subsystem 20 also implements a mechanism for batching callbacks for processing by the callback processor 24 at the end of each grace period. One exemplary batching technique is to maintain a set of callback queues 32A and 32B that are manipulated by a callback advancer 34. Although the callback queues 32A/32B can be implemented using a shared global array that tracks callbacks registered by each of the updaters $18_1, 18_2 \ldots 18_n$, improved scalability can be obtained if each read-copy update subsystem instance $20_1, 20_2 \ldots 20_n$ maintains its own pair of callback queues 32A/32B in a corresponding one of the cache memories $10_1, 10_2 \ldots 10_n$. Maintaining per-processor versions of the callback queues 32A/32B in the local caches $10_1, 10_2 \ldots 10_n$ reduces memory latency. Regardless of which implementation is used, the callback queue 32A, referred to as the "Next Generation" or "Nextlist" queue, can be appended (or prepended) with new callbacks by the callback registration component 22 as such callbacks are registered. The callbacks registered on the callback queue 32A will not become eligible for grace period processing until the end of the next grace period that follows the current grace period. The callback queue 32B, referred to as the "Current Generation" or "Waitlist" queue, maintains the callbacks that are eligible for processing at the end of the current grace period. As stated above, the callback processor 24 is responsible for executing the callbacks referenced on the callback queue set 32, and for removing the callbacks therefrom as they are processed. The callback advancer 34 is responsible for moving the callbacks on the Next Generation callback queue 32A to the end of the Current Generation callback queue 32B after a new grace period is started. The arrow labeled 34A in FIG. 5 illustrates this operation.

The reason why new callbacks are not eligible for processing and cannot be placed on the Current Generation callback queue 32B becomes apparent if it is recalled that a grace period represents a time frame in which all processors have passed through at least one quiescent state. If a callback has been pending since the beginning of a grace period, it is guaranteed that no processor will maintain a reference to the data element associated with the callback at the end of the grace period. On the other hand, if a callback was registered after the beginning of the current grace period, there is no guarantee that all processors potentially affected by this callback's update operation will have passed through a quiescent state.

In non-realtime computing environments, grace period detection can be conventionally based on each of the processors $4_1, 4_2 \ldots 4_n$ passing through a quiescent state that typically arises from a context switch. However, as described by way of background above, if the processors $4_1, 4_2 \ldots 4_n$ are programmed to run a preemptable realtime operating system, an executing process or thread (each of which may also be referred to as a "task"), such as any of the readers $21_1, 21_2 \ldots 21_n$, can be preempted by a higher priority process. Such preemption can occur even while the readers $21_1, 21_2 \ldots 21_n$ are in a kernel mode critical section referencing elements of the shared data set 16 (shared data elements). In order to prevent premature grace period detection and callback processing, a technique is needed whereby the readers $21_1, 21_2 \ldots 21_n$ can advise the RCU subsystem 20 that they are performing critical section processing.

Although one solution would be to suppress preemption across read-side critical sections, this approach can degrade realtime response latency. A more preferred approach is to have readers "register" with the RCU subsystem 20 whenever they enter a critical section and "deregister" upon leaving the critical section. To that end, the RCU subsystem 20 is provided with two fast-path routines that the readers $21_1, 21_2 \ldots 21_n$ can invoke in order to register and deregister with the RCU subsystem prior to and following critical section read-side operations. In FIG. 5, reference numeral 36 represents an RCU reader registration component that may be implemented using code such as the Linux® Kernel rcu_read_lock( ) primitive. Reference numeral 38 represents an RCU reader deregistration component that may be implemented using code such as the Linux® Kernel rcu_read_unlock( ) primitive. The registration component 34 is called by a reader $21_1, 21_2 \ldots 21_n$ immediately prior to entering its read-side critical section. This code "registers" the reader $21_1, 21_2 \ldots 21_n$ for grace period processing by assigning the reader to either a "current" or "next" generation grace period and by setting a grace period indicator (e.g., a counter or a lock) that is not reset until the reader exits the critical section. When a "next" generation grace period is commenced, the grace period indicators for each reader $21_1, 21_2 \ldots 21_n$ assigned to the peceding "current" grace period generation are periodically tested by the grace period controller 28. A further grace period will not be started until the indicators associated with the "current" generation grace period have been reset. The deregistration component 38 is called by a reader $21_1, 21_2 \ldots 21_n$ immediately after leaving its critical section. This code "deregisters" the reader $21_1, 21_2 \ldots 21_n$ from the RCU subsystem 20 by resetting the indicator set during invocation of the registration component 32, thereby signifying that the reader will not be impacted by removal of its critical section read data, and that a new grace period may be started.

Various techniques may be used to implement the registration and deregistration components 36 and 38. For example, commonly assigned application Ser. No. 11/248,096 discloses a design in which RCU reader registration/deregistration is implemented using counters. In particular, when a reader registers for RCU read-side processing, it increments a counter that corresponds to a particular grace period generation. Grace period advancement and callback processing to remove the reader's read-side data will not be performed until the reader deregisters and the assigned counter is decremented. Commonly assigned application Ser. No. 11/264, 580 discloses an alternative design for implementing RCU reader registration/deregistration using reader/writer locks. In particular, when a reader registers for read-side processing, it acquires a reader/writer lock. Grace period advancement and callback processing to remove the reader's read-side data will not be performed until the reader deregisters and releases the reader/writer lock. In order to start a new grace period and process callbacks, the writer portion of each reader/writer lock must be acquired.

Using either of the foregoing reader registration/deregistration techniques, preemption of a reader $21_1, 21_2 \ldots 21_n$ while in a read-side critical section will not result in premature callback processing because the RCU subsystem 20 must wait for each reader to deregister. However, as stated by way of background above, reader preemption or blocking while in a critical section following reader registration and prior to deregistration can cause produce undesirable out-of-memory (OOM) situations that prevent high priority real-time processes from proceeding. This problem can be solved by boosting reader priority, but a technique is needed for identifying preempted or blocked readers in an efficient manner, without resort to techniques such as scanning an entire system process list or maintaining a list of processes currently residing in an RCU read-side critical section.

There are three observations that are pertinent to the resolution of this problem. First, a process that is currently running will not immediately benefit from priority boosting. Moreover, if a process is currently running, boosting its priority will not make it run faster. Boosting the priority of a running process will only affect that process if some other process tries to preempt it. This means that boosting the priority of a process can be deferred until some later preemption event, which is comparatively rare. Second, if non-real-time processes are not permitted to preempt processes running in RCU read-side critical sections, then only (O)n non-realtime processes can be in need of priority boosting due to preemption, where "n" is the number of CPUs in the system. Third, there can be processes currently executing in RCU read-side critical sections that are nonetheless not holding up the current RCU grace period because only those processes whose RCU read-side critical sections commenced prior to the current grace period can be holding up that grace period.

Consistent with these three observations, the present invention provides a priority boosting solution in which a reader $21_1, 21_2 \ldots 21_n$ will only have its priority boosted under limited circumstances. In particular, in order for a reader $21_1, 21_2 \ldots 21_n$ to be eligible for a priority boost, it must be currently registered with the RCU subsystem 20 and running in an RCU read-side critical section. In addition, the reader $21_1, 21_2 \ldots 21_n$ must be subject to preemption or blocking (e.g., due to lock acquisition by another process) while in the read-side critical section. The grace period assigned to the reader $21_1, 21_2 \ldots 21_n$ may also taken into account when boosting reader priority.

If the required circumstances are present, the priority of the reader $21_1, 21_2 \ldots 21_n$ will be boosted to an appropriate level. The priority boost level assigned to a reader $21_1, 21_2 \ldots 21_n$ can be selected according to design preferences. One approach would be to assign the reader $21_1, 21_2 \ldots 21_n$ to a priority level that is above the base priority of all non-real-time processes, thereby ensuring that no other non-real-time process (except perhaps other priority-boosted readers) will have a higher priority. If desired, more than one priority boost level may be used and the priority of a reader $21_1, 21_2 \ldots 21_n$ could be boosted in stages depending on the prevailing system conditions. For example, an initial priority boost level could be used when a reader $21_1, 21_2 \ldots 21_n$ first receives a priority boost following a preemption attempt or is blocked from acquiring a lock. A secondary priority boost (e.g., to a real-time priority level) could then be applied if indications of an impending OOM situation were present. An impending OOM condition could be indicated an actual depletion of memory, or by the current grace period stalling or taking too long to complete. Another priority boost option would be to adjust the priority of readers $21_1, 21_2 \ldots 21_n$ according to the grace period to which they are assigned.

Figure 6:
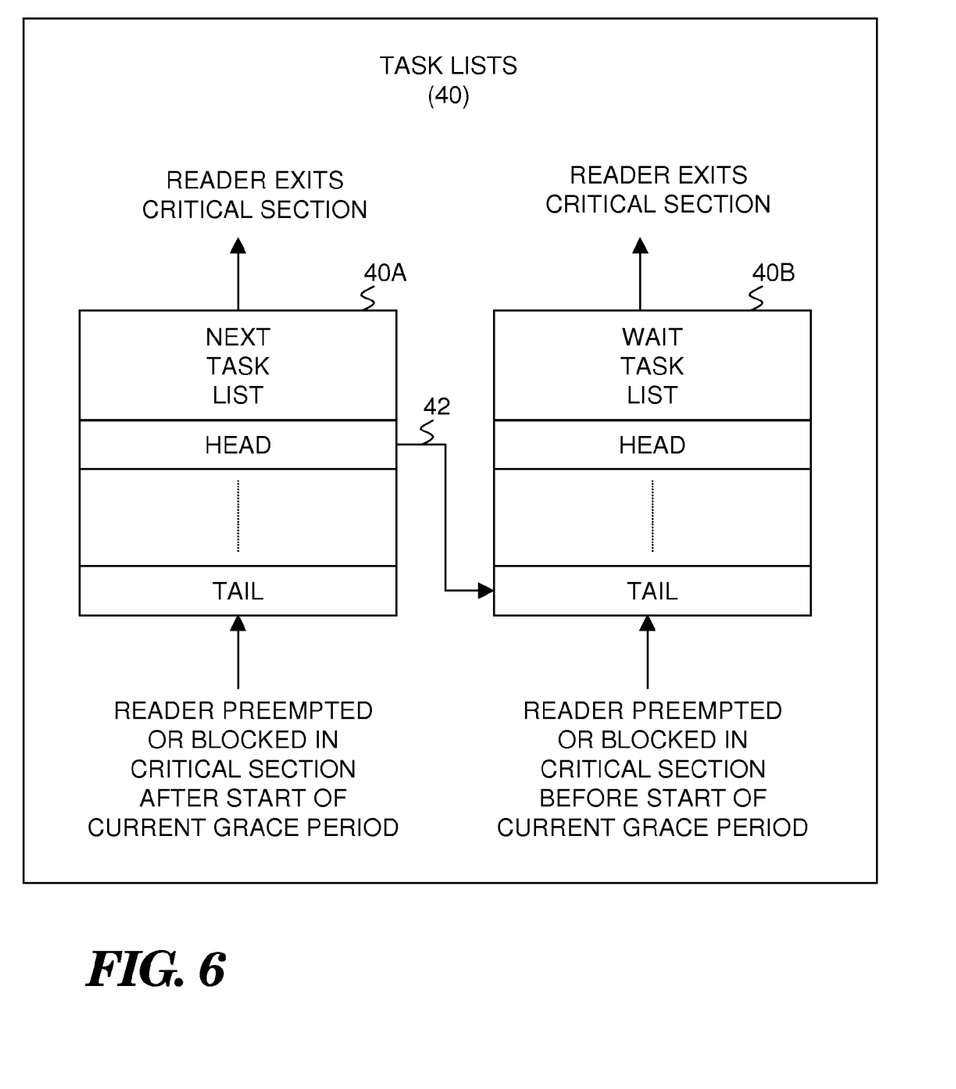
FIG. 6 is a functional block diagram showing a pair of task lists that may be used to track readers whose priority has been boosted during a current grace period and a previous grace period, respectively.

Optionally, as shown in FIG. 6, a priority boosted reader $21_1, 21_2 \ldots 21_n$ may be added to one of two lists 40 of priority boosted readers (or potentially two lists per processor in SMP systems). The lists 40 identify a reader's grace period and may be used to facilitate multiple priority boosts on a reader $21_1, 21_2 \ldots 21_n$, or to boost priority based on grace period, as discussed above. A first list 40A is a "Next" task list that identifies the readers $21_1, 21_2 \ldots 21_n$ that have entered their RCU read-side critical section after the beginning of the current grace period. A second list 40B is a "Wait" task list that identifies readers $21_1, 21_2 \ldots 21_n$ that have entered their RCU read-side critical section prior to the beginning of the current grace period. It will be appreciated that only the Wait list 40B needs be scanned to find readers $21_1, 21_2 \ldots 21_n$ holding up the current grace period because these readers are associated with a previous grace period whose callbacks would otherwise be eligible for callback processing. Because the number of readers $21_1, 21_2 \ldots 21_n$ on the Wait list 40A will be quite small compared to the number of readers on both lists, and extremely small compared to the full list of all processes in the system, the tracking of priority-boosted readers $21_1, 21_2 \ldots 21_n$ having the potential to negatively influence system operation can be handled with relatively minimal processor overhead.

As the priority-boosted readers $21_1, 21_2 \ldots 21_n$ on the Wait list 40B complete their RCU read-side critical sections, they can be removed from the Wait list and their priority may be returned to normal. Once all readers $21_1, 21_2 \ldots 21_n$ have been removed from the Wait list 40B, a new grace period may be started. If, at this time, if there are any readers $21_1, 21_2 \ldots 21_n$ remaining on the Next list 40A, they will be moved to the Wait list 40B and the Next list will be emptied. The arrow labeled 42 in FIG. 6 illustrates this operation.

Figure 7A:
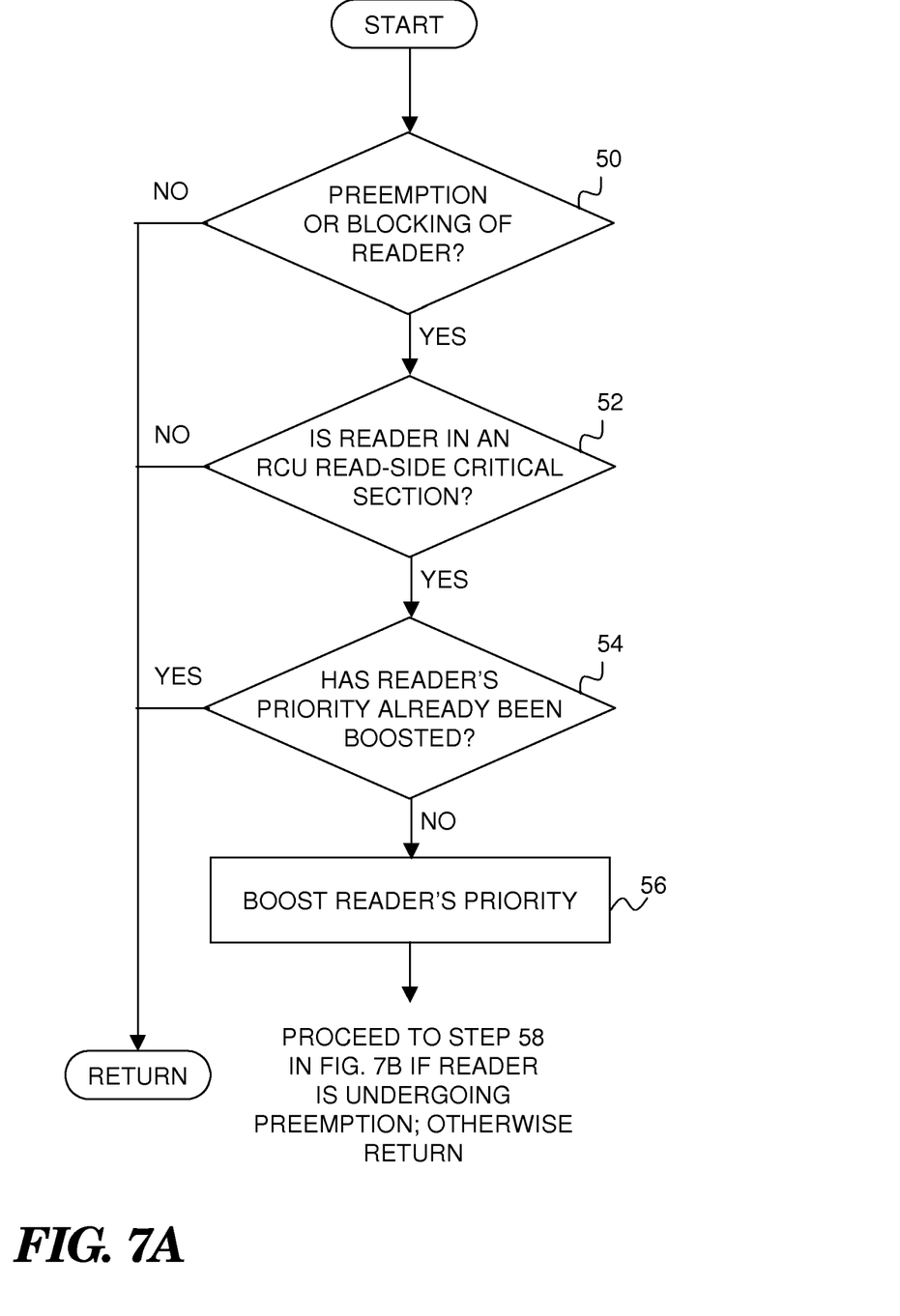
FIGS. 7A and 7B are parts of a flow diagram showing priority boost processing that may be performed on behalf of a reader referencing a shared data element protected by the read-copy update subsystem of FIG. 5.
Figure 7B:
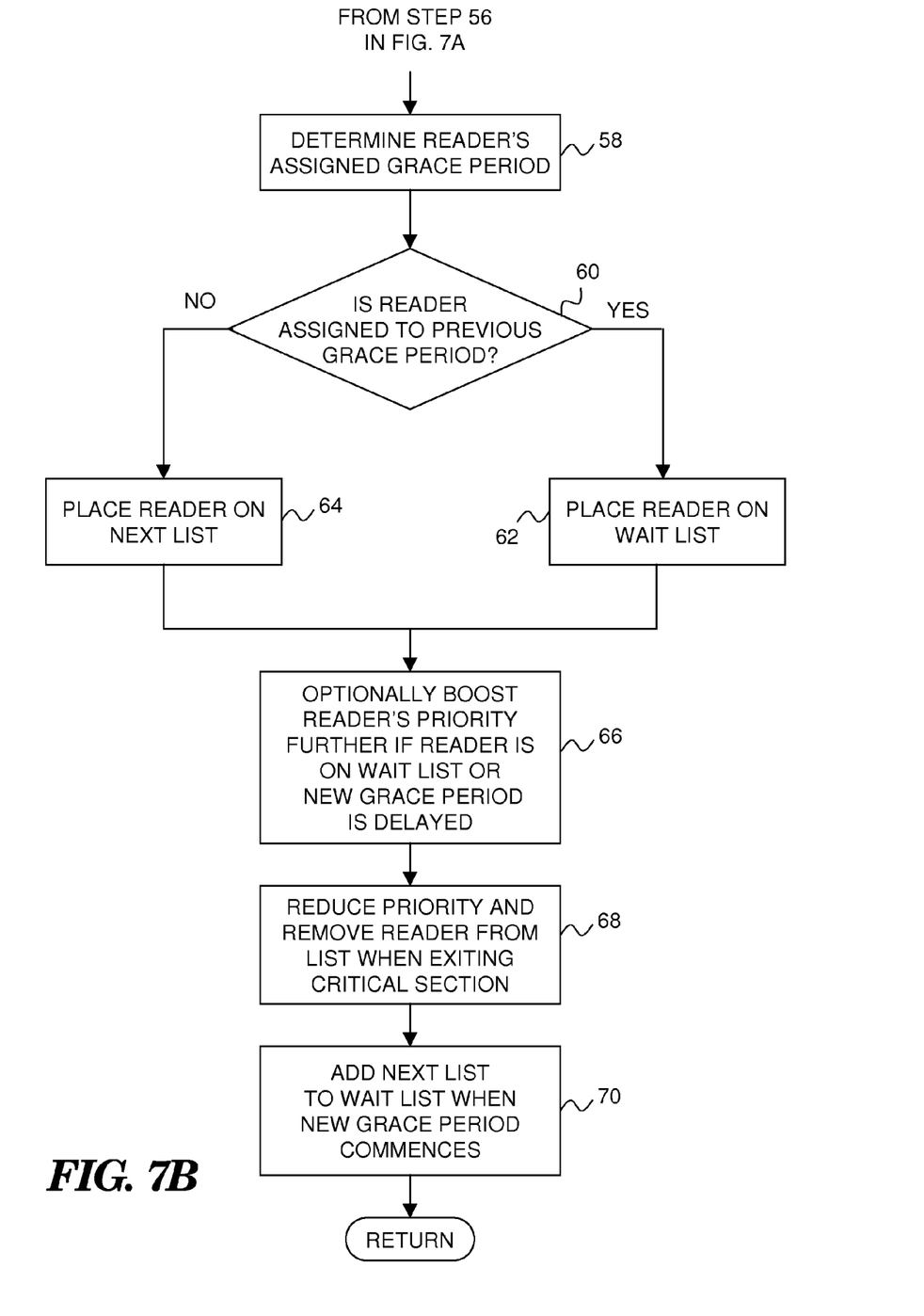

The foregoing processing may be performed according the flow diagram of FIGS. 7A and 7B. A first step 50 conditions further priority boost processing on a reader $21_1, 21_2 \ldots 21_n$ undergoing preemption or blocking. If neither circumstance is present, processing terminates. If the reader $21_1, 21_2 \ldots 21_n$ is undergoing preemption or blocking, a test is made in step 52 to determine whether the reader is in an RCU read-side critical section. If not, processing terminates. If the reader $21_1, 21_2 \ldots 21_n$ is in an RCU read-side critical section, a test is made in step 54 to determine if the reader has already had its priority boosted. If it has, processing terminates. If the priority of the reader $21_1, 21_2 \ldots 21_n$ has not yet been boosted, it is boosted in step 56. At this point, if the priority boost was due to the reader $21_1, 21_2 \ldots 21_n$ blocking (e.g., due to lock acquisition), processing may be terminated. If the priority boost was due to the reader $21_1, 21_2 \ldots 21_n$ being preempted, processing continues to add the reader to the Next list 40A or the Wait list 40B. In step 58 of FIG. 7B, the grace period assignment of the reader $21_1, 21_2 \ldots 21_n$ is determined. If, in step 60, the reader $21_1, 21_2 \ldots 21_n$ is assigned to the previous grace period, it is placed on the Wait list 40B in step 62. Otherwise, the reader $21_1, 21_2 \ldots 21_n$ is placed on the Next list 40A in step 64. In step 66, the priority of the reader $21_1, 21_2 \ldots 21_n$ may be optionally boosted further in the event that the reader is on the wait list 40B or if the current grace period is delayed. In step 68, the reader $21_1, 21_2 \ldots 21_n$ leaves its RCU critical section. The reader's priority is reduced to its original baseline level and the reader is removed from the list on which it resides. In step 70, a new grace period commences and the Next list 40A is added to the Wait list 40B.

Figure 8:
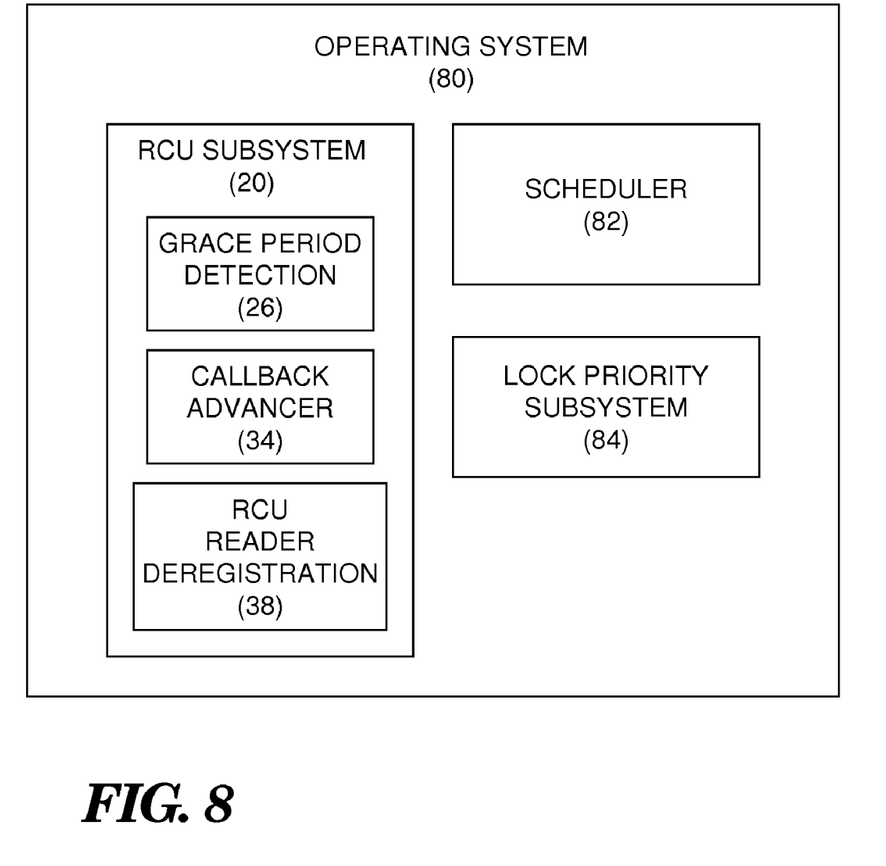
FIG. 8 is a functional block diagram showing operating system components that may be used to implement the priority boost processing of FIGS. 7A and 7B.

Turning now to FIG. 8, one way that the processing of FIGS. 7A and 7B may be performed is by components within RCU subsystem 20, the scheduler 82 of a host operating system 80, and if present, the operating system's lock priority subsystem 84. As previously stated, step 50 of FIG. 7A conditions further priority boost processing on a reader $21_1, 21_2 \ldots 21_n$ undergoing preemption or being blocked. Preemption is conventionally performed by the operating system scheduler 82 when the reader is currently running on one of the processor's $4, 4_2 \ldots 4_n$ and a higher priority task on the scheduler's run queue needs to acquire the same processor. In a conventional real-time operating system, a real-time scheduler will preempt the currently running task in favor of the higher priority task. In order to implement the invention, the scheduler 82 may be implemented as a conventional real-time scheduler that includes additional logic for implementing the processing of steps 52-66 of FIGS. 7A and 7B. Thus, before preempting a reader $21_1, 21_2 \ldots 21_n$, the scheduler 82 will determine if the reader is in an RCU read-side critical section (step 52), determine if the reader has already had its priority boosted (step 54), boost the reader's priority as necessary (step 54), add the reader to the appropriate task list (steps 58-64), and optionally boost the reader's priority further if necessary (step 66). Conventional preemption may then be performed.

The foregoing processing steps can be implemented by the scheduler 82 in any suitable manner. For example, the scheduler 82 may determine whether a reader $21_1, 21_2 \ldots 21_n$ is in an RCU read-side critical section in step 52 to by consulting an RCU read-processing flag in the reader's task structure that is set during reader registration by the RCU reader registration component 36. For step 54, the scheduler 82 need only check the priority level value of the reader's task structure. For step 56, the scheduler 82 may adjust the same priority level value to reflect the new priority. Although the operating system task queue (not shown) must be locked for this operation, this will already be the case when the scheduler 82 is engaged in preemption, which is one reason why the scheduler is ideally suited to perform the priority boost operation. Optionally, the scheduler 82 may save the old (non-boosted) priority for subsequent use in the priority reduction operation of step 68. Alternatively, if the non-boosted priority of a reader $21_1, 21_2 \ldots 21_1$ can be calculated, there is no need to save it. For step 58, the scheduler 82 may determine the assigned grace period of a reader $21_1, 21_2 \ldots 21_n$ by consulting an RCU grace period assignment element of the reader's task structure that is set during reader registration by the RCU reader registration component 36. Steps 60-64 can be performed by manipulating the Next list 40A and the Wait list 40B. Step 66 may be performed by the scheduler 82 and/or by the RCU subsystem's grace period detection component 26. If step 66 is only used to boost the priority of a reader $21_1, 21_2 \ldots 21_n$ because it has been assigned to the wait list 40B, no involvement by the grace period detection component 26 is required. The second priority boost in this case may be handled solely by the scheduler 82. On the other hand, if step 66 is used to provide a secondary priority boost due to grace period delay, the grace period detection component 26 may participate. In particular, the grace period detection component 26 may be programmed to record a timestamp whenever a new grace period is started. Each time there is a check to see if the current grace period has ended, the timestamp may also be checked to determine if the grace period has exceeded a predetermined time period. If the grace period duration exceeds the threshold, either the grace period detection component 26 or the scheduler 82 may scan the Wait list 40B and impart a secondary boost to each task on the list. In order to have the scheduler 82 perform this work, the grace period detection component 26 needs to scan the Wait list 40B and instead of boosting each reader $21_1, 21_2 \ldots 21_n$ on the list, set a flag in the reader task structures so that the scheduler may subsequently perform the secondary boost operation. Assuming readers $21_1, 21_2 \ldots 21_n$ will only be boosted a maximum of two times, twice-boosted readers may be optionally removed from the Wait list 40B insofar as they need not be tracked for further boosting.

As previously stated, some operating systems may implement the lock priority subsystem 84. The purpose of this subsystem is to dynamically adjust the priorities of processes that are blocked because another process has acquired a lock that the blocked process is trying to access. In some cases, a condition known a priority inversion may occur in which a high priority process is blocked by a low priority process that holds a common lock. If an intermediate priority process preempts the low priority process, the high priority process may block indefinitely while the intermediate priority process runs. One solution to this problem is to use a lock priority scheme that implements priority inheritance. According to the priority inheritance technique, the low priority process in the example above will inherit the priority of the high priority process, allowing it to be scheduled for execution and thereby release the lock needed by the high priority process. The original priority of the low priority process will then be restored.

The lock priority subsystem 84 is assumed to implement priority inheritance to manage the various locks of the operating system 80 on behalf of processes that vie for contention of the locks. These locks and processes can be managed as priority inheritance chains (pi chains) in which a first process waits for a lock owned by a second process that is in turn waiting for a lock owned by a third process, and so on. A priority setting algorithm in the lock priority subsystem 84 is used to adjust the priorities of processes in a priority inheritance chain in the event that priority inversion arises. In recent Linux® realtime patchsets, the priority setting algorithm is provided by a function called "pi_setprio( )" that is associated with the rt_mutex primitive. In accordance with the present invention, boosting the priority of readers $21_1, 21_2 \ldots 21_n$ that are blocked in a priority inheritance chain can be performed by modifying a conventional priority setting algorithm, such as the Linux® rt_mutex pi_setprio( ) function, so as to take into account RCU read-side critical section processing. To that end, logic may be added that performs steps 52-56 whenever the priority setting algorithm performs dynamic priority adjustments. In this way, the lock priority subsystem 84 will account for RCU-induced priority boosting when the priority setting algorithm walks the priority inheritance chains.

The last two steps in the priority boost processing of FIGS. 7A and 7B are steps 68 and 70. Step 68 can be implemented by the RCU reader deregistration component 38 of the RCU subsystem 20. Thus, in addition to its conventional reader deregistration operations for a reader $21_1, 21_2 \ldots 21_n$, the deregistration component 38 will check the reader's task structure to determine if there has been a priority boost. If so, the deregistration component 38 will remove the reader from either the Next list 40A or the Wait list 40B and reduce the reader's priority back to its baseline priority. Step 70 can be implemented by the callback advancer 34 of the RCU subsystem 20. Thus, whenever a new grace period starts and callbacks are advanced for processing, the callback advancer 34 can also merge the Next list 40A onto the Wait list 40B.

Accordingly, a technique has been disclosed for efficiently boosting the priority of a preempted reader in order to remove impediments to grace period processing in which the destruction of a shared data element is deferred until pre-existing references to the data element are removed. Advantageously, reader priority boosting is performed only when a reader is preempted or blocked while executing an RCU read-side critical section. In the common case of no preemption, the invention will add only the minimal overhead of checking for these conditions. If priority boosting is required, it can be handled efficiently by the scheduler and lock priority subsystem. No changes are required to the fast path reader registration operation and only minimal overhead is added to the reader deregistration operation. Because the lists of readers with boosted priorities will be relatively small, the lists may be easily scanned or otherwise manipulated.

Figure 9:
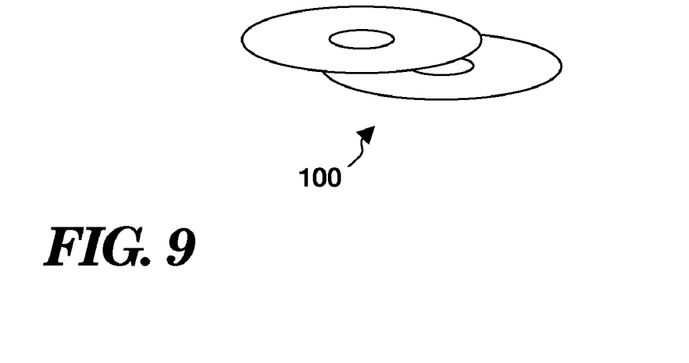
FIG. 9 is a diagrammatic illustration of media that can be used to provide a computer program product for implementing efficient priority boosting in accordance with the invention.

It will be appreciated that the foregoing concepts may be variously embodied in any of a data processing system, a machine implemented method, and a computer program product in which programming logic is provided by one or more machine-useable media for use in controlling a data processing system to perform the required functions. Relative to a computer program product having a machine-readable media and programming logic for controlling a data processing system, exemplary machine-readable media for providing such programming logic are shown by reference numeral 100 in FIG. 9. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. The programming logic could also be provided by portable magnetic storage media (such as floppy disks, flash memory sticks, etc.), or magnetic storage media combined with drive systems (e.g. disk drives), or storage media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or signal-carrying medium (such as a network), or other entity that can contain, store, communicate, propagate or transport the programming logic for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the appended claims and their equivalents.

What is claimed is:

1. A method for efficiently boosting the priority of a preemptable data reader in order to eliminate impediments to grace period processing that defers the destruction of one or more shared data elements that may be referenced by said reader until said reader is no longer capable of referencing said one or more data elements, comprising:
   upon said reader being subject to preemption or blocking:
   determining whether said reader is in a read-side critical section referencing any of said one or more shared data elements;
   detecting the existence of a predetermined condition other than whether said reader is in said critical section;
   boosting said reader's priority when said reader is in said critical section from an existing priority level to a priority boost level that is higher than said existing priority level to expedite said reader's completion of said critical section, said priority boost level having a first magnitude when said predetermined condition is not detected and a second magnitude that is greater than said first magnitude when said predetermined condition is detected; and
   decreasing said reader's priority following said reader's completion of said critical section.

2. A method in accordance with claim 1 wherein said priority boosting is performed by one of a scheduler or a lock priority subsystem.

3. A method in accordance with claim 1 wherein said priority boosting comprises boosting said reader's priority to a priority boost level that is higher than a base priority of all non-realtime processes that would otherwise be capable of preempting said reader.

4. A method in accordance with claim 1 wherein said priority boosting comprises boosting said reader's priority to a first priority boost level having said first magnitude if said reader is in said critical section and to a second priority boost level having said second magnitude upon the occurrence of said predetermined condition.

5. A method in accordance with claim 4 wherein said predetermined condition is one of a grace period delay signifying an impending out-of-memory condition or said reader having entered said critical section prior to a current grace period.

6. A method in accordance with claim 1 further including placing said reader on a first list of priority boosted readers if said reader entered said critical section during a current grace period and placing said reader on a second list of priority boosted readers if said reader entered said critical section during a previous grace period, said second list being used to identify readers whose priorities may need to be boosted higher than readers on said first list.

7. A method in accordance with claim 6 further including moving readers on said first list to said second list when said current grace period ends.

8. A data processing system having one or more processors, a memory and a communication pathway between the one or more processors and the memory, said system being adapted to efficiently boost the priority of a preemptable data reader in order to eliminate impediments to grace period processing that defers the destruction of one or more shared data elements that may be referenced by said reader until said reader is no longer capable of referencing said one or more data elements, and comprising:
- a real-time preemptive scheduler adapted to preemptively schedule said reader for execution;
- a lock priority subsystem adapted to implement priority inheritance management of a sharable lock that may be held by said reader;
- a grace period detection component adapted to detect the end of a current grace period and initiate a new grace period;
- a callback advancer adapted to advance shared data element destruction callbacks for processing when said grace period detection component initiates a new grace period;
- a reader registration component adapted to indicate to said grace period detection component that said reader is entering said critical section;
- a reader deregistration component adapted to indicate to said grace period detection component that said reader is exiting said critical section;
- said scheduler and said lock priority subsystem being respectively responsive to said reader being subject to preemption or blocking by:
- determining whether said reader is in a read-side critical section referencing any of said one or more shared data elements; and
- boosting said reader's priority if said reader is in said critical section to expedite said reader's completion of said critical section; and
- said reader deregistration component being responsive to said reader having a boosted priority level by decreasing said reader's priority following said reader's completion of said critical section.

9. A system in accordance with claim 8 wherein said priority boosting comprises boosting said reader's priority to a priority boost level that is higher than a base priority of all non-realtime processes that would otherwise be capable of preempting said reader.

10. A system in accordance with claim 8 wherein said priority boosting comprises boosting said reader's priority to a first priority boost level if said reader is in said critical section and to a second priority boost level upon the occurrence of a predetermined condition.

11. A system in accordance with claim 10 wherein said predetermined condition is one of a grace period delay determined by said grace period detection component and signifying an impending out-of-memory condition or said reader having entered said critical section prior to a current grace period.

12. A system in accordance with claim 8 wherein said scheduler is further responsive to preemption said reader by placing said reader on a first list of priority boosted readers if said reader entered said critical section during a current grace period and placing said reader on a second list of priority boosted readers if said reader entered said critical section during a previous grace period, said second list being used to identify reader whose priorities may need to be boosted higher than readers on said first list.

13. A system in accordance with claim 12 wherein said callback advancer is adapted to move readers on said first list to said second list when said current grace period ends.

14. A computer program product for efficiently boosting the priority of a preemptable data reader in order to eliminate impediments to grace period processing that defers the destruction of one or more shared data elements that may be referenced by said reader until said reader is no longer capable of referencing said one or more data elements, comprising:
- one or more machine-useable storage media;
- programming logic provided by said one or more storage media for programming a data processing platform to operate as by:
- upon said reader being subject to preemption or blocking:
- determining whether said reader is in a read-side critical section referencing any of said one or more shared data elements;
- detecting the existence of a predetermined condition other than whether said reader is in said critical section;
- boosting said reader's priority when said reader is in said critical section from an existing priority level to priority boost level that is higher than said existing priority level to expedite said reader's completion of said critical section, said priority boost level having a first magnitude when said predetermined condition is not detected and a second magnitude that is greater than said first magnitude when said predetermined condition is detected; and
- decreasing said reader's priority following said reader's completion of said critical section.

15. A computer program product in accordance with claim 14 wherein said priority boosting is performed by one of a scheduler or a lock priority subsystem.

16. A computer program product in accordance with claim 14 wherein said priority boosting comprises boosting said reader's priority to a priority boost level that is higher than a base priority of all non-realtime processes that would otherwise be capable of preempting said reader.

17. A computer program product in accordance with claim 14 wherein said priority boosting comprises boosting said reader's priority to a first priority boost level having said first magnitude if said reader is in said critical section and to a second priority boost level having said second magnitude upon the occurrence of said predetermined condition.

18. A computer program product in accordance with claim 17 wherein said predetermined condition is one of a grace period delay signifying an impending out-of-memory condition or said reader having entered said critical section prior to a current grace period.

19. A computer program product in accordance with claim 14 wherein said programming logic is further adapted to program said data processing platform to place said reader on a first list of priority boosted readers if said reader entered said critical section during a current grace period and place said reader on a second list of priority boosted readers if said reader entered said critical section during a previous grace period, said second list being used to identify readers whose priorities may need to be boosted higher than readers on said first list.

20. A computer program product in accordance with claim 19 wherein said programming logic is further adapted to program said data processing platform to move readers on said first list to said second list when said current grace period ends.

* * * * *